US010515357B2

(12) United States Patent
DeLuca et al.

(10) Patent No.: US 10,515,357 B2
(45) Date of Patent: Dec. 24, 2019

(54) SYSTEMS AND METHODS FOR AUTHENTICATING ELECTRONIC TRANSACTIONS

(71) Applicant: Capital One Financial Corporation, McLean, VA (US)

(72) Inventors: Brian DeLuca, Midlothian, VA (US); Max Doerfler, Richmond, VA (US); Jamie Warder, Bethesda, MD (US); Anurag Joshi, Glen Allen, VA (US); Mohammed Zafar Iqbal, McLean, VA (US); Kevin Rosengren, Richmond, VA (US); William A. Hodges, Mechanicsville, VA (US); Ken Allen, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/829,454

(22) Filed: Dec. 1, 2017

(65) Prior Publication Data

US 2018/0082286 A1    Mar. 22, 2018

Related U.S. Application Data

(63) Continuation of application No. 14/680,531, filed on Apr. 7, 2015.

(Continued)

(51) Int. Cl.
*G06Q 20/18*   (2012.01)
*G06Q 20/38*   (2012.01)
*G06Q 20/40*   (2012.01)

(52) U.S. Cl.
CPC ..... *G06Q 20/382* (2013.01); *G06Q 20/40145* (2013.01)

(58) Field of Classification Search
CPC ............ G06Q 20/40145; G06Q 20/18; G06Q 20/3223

(Continued)

(56) References Cited

U.S. PATENT DOCUMENTS

| 2011/0035788 A1* | 2/2011 | White | G06F 21/32 726/4 |
| 2013/0290136 A1* | 10/2013 | Sheets | G06Q 30/0609 705/26.35 |
| 2014/0108249 A1* | 4/2014 | Kulpati | G06Q 20/3223 705/44 |

* cited by examiner

*Primary Examiner* — Hai Tran
(74) *Attorney, Agent, or Firm* — Finnegan, Henderson, Farabow, Garrett & Dunner, LLP

(57) ABSTRACT

The disclosed embodiments provide systems and methods for authenticating electronic transactions. A system for authenticating electronic transactions may include one or more memory devices storing instructions and one or more processors configured to receive transaction data associated with a transaction and further associated with a customer. The transaction data includes a customer identifier. The one or more processors may be configured to identify a customer account associated with the customer based on the customer identifier, and determine an authentication tier level associated with the transaction. The authentication tier level may reflect one or more levels of authentication required to authorize the transaction. The one or more processors may be configured to receive authentication data associated with a customer, and determine whether the authentication data satisfies the authentication tier level associated with the transaction and authorize the transaction when the authentication data satisfies the authentication tier level.

20 Claims, 13 Drawing Sheets

Related U.S. Application Data

(60) Provisional application No. 61/976,659, filed on Apr. 8, 2014.

(58) Field of Classification Search
USPC .......................................................... 705/44
See application file for complete search history.

SYSTEMS AND METHODS FOR AUTHENTICATING ELECTRONIC TRANSACTIONS

PRIORITY CLAIM

This is a continuation of U.S. patent application Ser. No. 14/680,531 filed Apr. 7, 2015, which claims priority from U.S. Provisional Application No. 61/976,659, filed Apr. 8, 2014, the entire contents of both of which are hereby expressly incorporated by reference in the present application.

TECHNICAL FIELD

The disclosed embodiments generally relate to systems and methods for authenticating electronic transactions, and more particularly, to systems and methods for authenticating electronic transactions through tiered biometric identification.

BACKGROUND

Consumers often use mobile channels and applications when performing electronic transactions related to their accounts, such as financial accounts. Typical mobile applications on a device, such as a smart phone or tablet, limit the number, type, or value of transactions. Although mobile applications exist, certain transactions still require human intervention. For example, high dollar cash withdrawals, PIN resets, permanent debit card limit increases, and high dollar wires cannot be performed on mobile applications and must be conducted in person with a representative of a financial account provider. Requiring that certain transactions be conducted in person creates an inconvenience for the customer, who would prefer to conduct these transactions without having to travel to conduct transactions in person.

Current authentication mechanisms vary by channel (mobile, online, in person), requiring the customer to remember his or her credentials for each distinct channel. For example, a customer may be required to remember a username and password, social security number, account number, and ATM PIN number, depending on the channel they use to conduct financial transactions.

Further, some typical authentication procedures are cumbersome and inconvenient for customers. Typically, when a customer authenticates themselves to a financial services provider, be it a digital channel or physical channel, they are required to answer several personal authentication questions. Often the answers to these questions are difficult for the customer to remember and take time to answer.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

Certain disclosed embodiments provide improved systems and methods for authenticating electronic transactions through tiered biometric identification. For example, certain disclosed embodiments may enable customers to conduct a broader range of electronic financial transactions through mobile channels, such as a mobile application on a mobile device. Certain disclosed embodiments may provide services that are valuable to both consumers and financial service providers. For example, aspects of the disclosed embodiments may provide a process for authenticating and conducting electronic transactions from a mobile channel. Aspects of the disclosed embodiments may also allow a user to easily and securely conduct electronic transactions through a mobile channel. Such aspects may help consumers by allowing them to conduct financial transactions without having to physically visit financial service provider brick and mortar locations. Moreover, certain aspects of the disclosed embodiments may allow a financial service provider to attract new customers and encourage current customers to use the financial service provider's accounts and services more often.

Other aspects of the disclosed embodiments are set forth below in this disclosure. For example, the disclosed embodiments may include a system for authorizing an electronic transaction. The system may include, for example, one or more memory devices storing instructions and one or more processors configured to execute the instructions. The one or more processors may be configured to execute the instructions in order to receive transaction data associated with a transaction and further associated with a customer. The transaction data may include a customer identifier. The one or more processors may be configured to identify a customer account associated with the customer based on the customer identifier. Additionally, the one or more processors may be configured to determine an authentication tier level associated with the transaction. The authentication tier level may reflect one or more levels of authentication required to authorize the transaction. The one or more processors may further be configured to receive authentication data associated with a customer. The one or more processors may be configured to determine whether the authentication data satisfies the authentication tier level associated with the transaction and authorize the transaction when the authentication data satisfies the authentication tier level.

The disclosed embodiments also include a computer-implemented method for authorizing an electronic transaction. The method may include, for example, receiving transaction data associated with a transaction and further associated with a customer. The transaction data may include a customer identifier. The method may further include identifying a customer account associated with the customer based on the customer identifier. Additionally, the method may include determining an authentication tier level associated with the transaction. The authentication tier level may reflect one or more levels of authentication required to approve the transaction. The method may also include receiving authentication data associated with a customer. The method may include determining whether the authentication data satisfies the at least one authentication tier and authorizing the transaction when the authentication data satisfies the authentication tier level.

In accordance with additional embodiments of the present disclosure, a computer-readable medium is disclosed that stores instructions that, when executed by a processor(s), causes the processor(s) to perform operations consistent with one or more disclosed methods.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
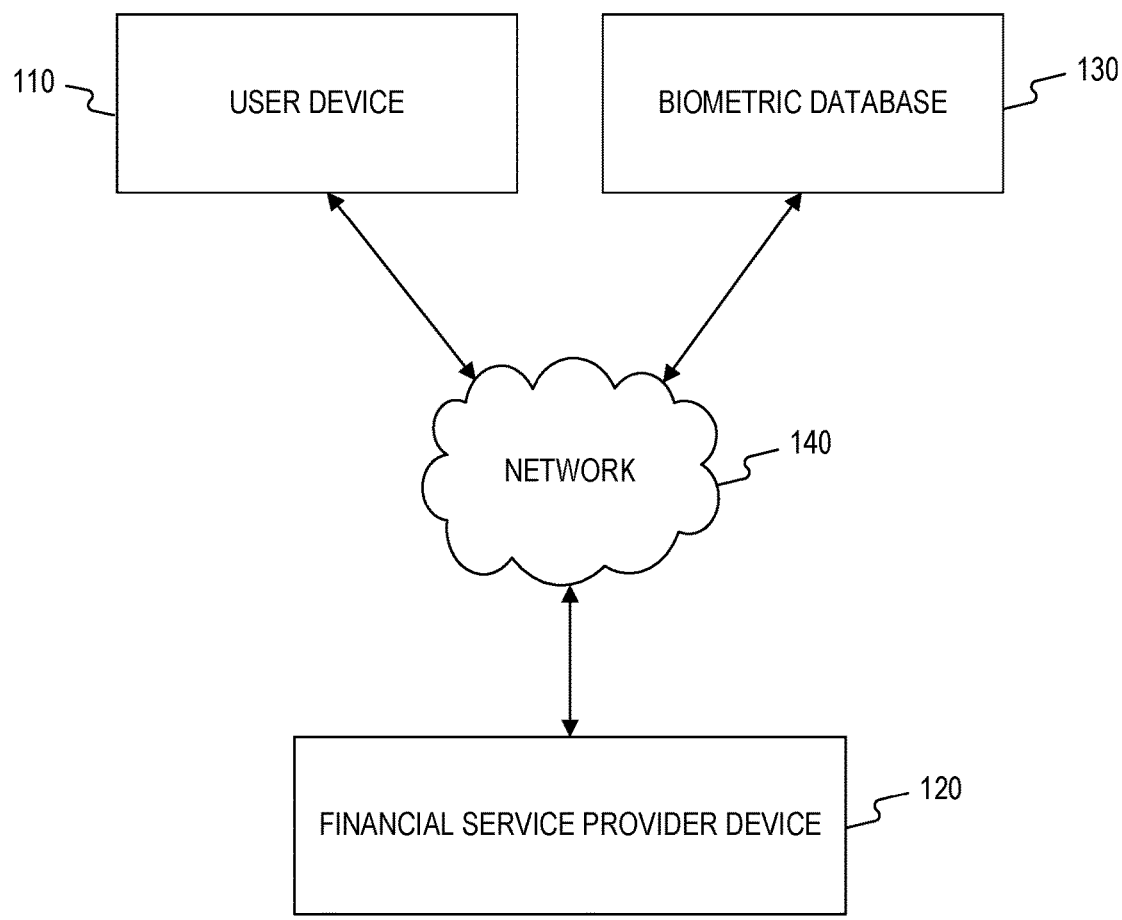
FIG. 1 is a block diagram of an exemplary system, consistent with disclosed embodiments.

FIG. 1 shows a diagram of an exemplary authentication system 100, consistent with disclosed embodiments. As shown in FIG. 1, system 100 may include a user device 110, a financial service provider device 120, and a network 140 to facilitate communication among the components of system 100. The components and arrangement of the components included in system 100 may vary. Thus, system 100 may further include other components that perform or assist in the performance of one or more processes consistent with the disclosed embodiments. The components and arrangements shown in FIG. 1 are not intended to limit the disclosed embodiments, as the components used to implement the disclosed processes and features may vary.

In accordance with disclosed embodiments, system 100 may include a financial service provider (FSP) device 120. FSP device 120 may be a system associated with a financial service provider (not shown), such as a bank, a credit card company, a lender, brokerage firm, or any other type of financial service entity that generates, provides, manages, maintains financial service accounts, etc. for one or more users. FSP device 120 may be one or more computing systems that are configured to execute software instructions stored on one or more memory devices to perform one or more operations consistent with the disclosed embodiments. For example, FSP device 120 may include one or more memory device(s) storing data and software instructions and one or more processor(s) configured to use the data and execute the software instructions to perform server-based functions and operations known to those skilled in the art. FSP device 120 may include one or more general purpose computers, specialized computers with hardware and/or software modules configured to perform functions related to disclosed methods, mainframe computers, or any combination of these types of components.

In certain embodiments, FSP device 120 may be configured as a particular apparatus, system, and the like based on the storage, execution, and/or implementation of the software instructions that perform one or more operations consistent with the disclosed embodiments. FSP device 120 may be standalone, or it may be part of a subsystem, which may be part of a larger system. For example, FSP device 120 may represent distributed servers that are remotely located and communicate over a network (e.g., network 140) or a dedicated network, such as a LAN, for a financial service provider. An exemplary computing system consistent with FSP device 120 is discussed in additional detail with respect to FIG. 2, below.

FSP device 120 may include or may access one or more storage devices configured to store data and/or software instructions used by one or more processors of FSP device 120 to perform operations consistent with disclosed embodiments. For example, FSP device 120 may include memory 230 configured to store one or more software programs that performs several functions when executed by a processor. The disclosed embodiments are not limited to separate programs or computers configured to perform dedicated tasks. For example, FSP device 120 may include memory that stores a single program or multiple programs. Additionally, FSP device 120 may execute one or more programs located remotely from FSP device 120. For example, FSP device 120 may access one or more remote programs stored in memory included with a remote component that, when executed, perform operations consistent with the disclosed embodiments. In certain aspects, FSP device 120 may include server software that generates, maintains, and provides services associated with financial service provider account management. In other aspects, FSP device 120 may connect separate server(s) or similar computing devices that generate, maintain, and provide services associated with financial data for a financial service provider associated with FSP device 120.

System 100 may also include one or more biometric databases 130. Biometric database 130 may include one or more memory device(s) that store data that may be used for performing one or more processes consistent with the disclosed embodiment. In certain aspects, biometric database 130 may additionally, or alternatively, include one or more servers or other type of computer devices. The biometric database 130 server(s) may be one or more computing devices configured to execute software instructions stored in memory to perform one or more processes consistent with the disclosed embodiments. For example, biometric database 130 may include one or more memory device(s) storing data and software instructions and one or more processor(s) configured to use the data and execute the software instructions to perform server-based functions and operations known to those skilled in the art.

Biometric database 130 may further include server(s) that are configured to execute stored software instructions to perform operations associated with collecting, storing, and accessing biometric data, including one or more processes associated with gathering biometric data from a variety of sources, compiling the data, and organizing the data into easily accessible profiles. Biometric database 130 may include one or more servers that may be a general purpose computer, a mainframe computer, or any combination of these components. In certain embodiments, biometric database 130 (or a system including biometric database 130) may be configured as a particular apparatus, system, and the like based on the storage, execution, and/or implementation of the software instructions that perform one or more operations consistent with the disclosed embodiments. A biometric database 130 may be standalone, or it may be part of a subsystem, which may be part of a larger system. For example, biometric database 130 may represent distributed servers that are remotely located and communicate over a network (e.g., network 140) or a dedicated network, such as a LAN. An exemplary computer system consistent with biometric database 130 is discussed in additional detail with respect to FIG. 2.

In certain embodiments, biometric database 130 may be associated with an entity, such as a company, organization, agency, etc. In one embodiment, the biometric database entity may be a different entity than a financial service provider associated with FSP device 120. In certain aspects, a user or user(s) affiliated with a biometric database entity may operate one or more components associated with biometric database 130 to collect and maintain biometric data. In other embodiments, biometric database 130 may be associated with a financial service provider or other entity associated with FSP device 120. For example, biometric database 130 may be a part or subpart of FSP device 120.

System 100 may further include one or more user devices 110. A user may operate a user device 110, which may be a desktop computer, laptop, tablet, smartphone, multifunctional watch, pair of multifunctional glasses, tracking device, or any suitable device with computing capability. User device 110 may include one or more processor(s) and memory device(s) known to those skilled in the art. For example, user device 110 may include memory device(s) that store data and software instructions that, when executed by one or more processor(s), perform operations consistent with the disclosed embodiments. In one aspect, user device 110 may have a financial application installed thereon, which may enable user device 110 to communicate with FSP device 120 via network 140. For instance, user device 110 may be a smartphone or tablet (or the like) that executes a stored mobile app that performs online banking operations. In other embodiments, user device 110 may connect to FSP device 120 through use of browser software stored and executed by user device 110. User device 110 may be configured to execute software instructions that allow a user to access information stored in FSP device 120, such as, for example, financial information related to recent purchase transactions, financial discounts, financial statements, account information, rewards program information and the like. Additionally, user device 110 may be configured to execute software instructions that initiate and conduct transactions with FSP device 120, such as, for example, ATM withdrawals, wire transfers, debit card PIN resets, and call center transactions. An exemplary computer system consistent with user device 110 is discussed in additional detail with respect to FIG. 2.

A user may operate user device 110 to perform one or more operations consistent with the disclosed embodiments. In one aspect, a user may be a customer of financial service provider. For instance, a financial service provider may maintain a financial service account (e.g., checking account, savings account, debit card account, or credit card account) for the user that the user may use to purchase goods and/or services. Additionally or alternatively, the user may use user device 110 and the financial service account (for example, through a mobile application installed on user device 110) to withdraw cash from an ATM, contact a customer call center, transfer or wire money, or reset their debit account PIN.

Network 140 may comprise any type of computer networking arrangement used to exchange data. For example, network 140 may be the Internet, a private data network, a virtual private network using a public network, a WiFi network, a LAN or WAN network, and/or other suitable connections that may enable information exchange among various components of the discount system 100. Network 140 may also include a public switched telephone network ("PSTN") and/or a wireless cellular network. Network 140 may be a secured network or unsecured network. In other embodiments, one or more components of system 100 may communicate directly through a dedicated communication link(s), such as links between user device 110, financial service provider device 120, and biometric database 130. Other components known to one of ordinary skill in the art may be included in authentication system 100 to process, transmit, provide, and receive information consistent with the disclosed embodiments. In addition, although not shown in FIG. 1, components of system 100 may communicate with each other through direct communications, rather than through network 140. Direct communications may use any suitable technologies, including, for example, Bluetooth™, Bluetooth LE™, WiFi, near field communications (NFC), or other suitable communication methods that provide a medium for transmitting data between separate devices.

Figure 2:
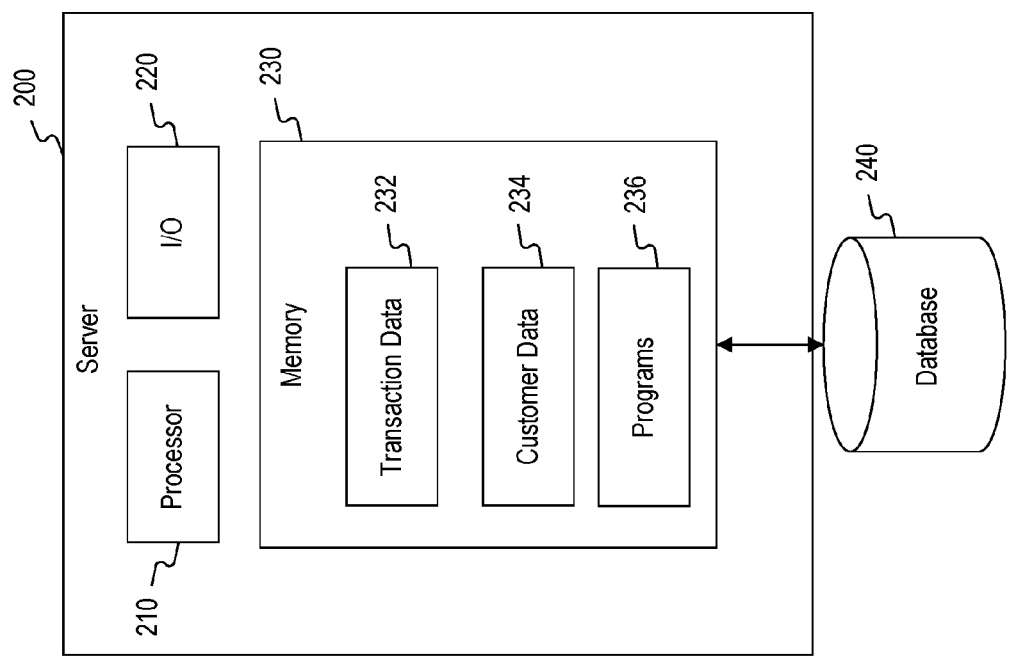
FIG. 2 is a block diagram of an exemplary computer system, consistent with disclosed embodiments.

FIG. 2 shows a diagram of an exemplary computing system 200 illustrating a computing system configuration that may be associated with financial service provider device 120, biometric database 130, and/or user device 110, consistent with disclosed embodiments. In one embodiment, computing system 200 may have one or more processors 210, one or more memories 230, and one or more input/output (I/O) devices 220. In some embodiments, computing system 200 may take the form of a server, general purpose computer, a mainframe computer, laptop, smartphone, mobile device, or any combination of these components. In certain embodiments, computing system 200 (or a system including computing system 200) may be configured as a particular apparatus, system, and the like based on the storage, execution, and/or implementation of the software instructions that perform one or more operations consistent with the disclosed embodiments. Computing system 200 may be standalone, or it may be part of a subsystem, which may be part of a larger system.

Processor 210 may include one or more known processing devices, such as a microprocessor from the Pentium™ or Xeon™ family manufactured by Intel™, the Turion™ family manufactured by AMD™, or any of various processors manufactured by Sun Microsystems. Processor 210 may constitute a single core or multiple core processor that executes parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) configured in computing system 200.

Memory 230 may include one or more storage devices configured to store instructions used by processor 210 to perform functions related to the disclosed embodiments. For example, memory 230 may be configured with one or more software instructions, such as program(s) 236 that may perform one or more operations when executed by processor 210. The disclosed embodiments are not limited to separate programs or computers configured to perform dedicated tasks. For example, memory 230 may include a program 236 that performs the functions of computing system 200, or program 236 could comprise multiple programs. Additionally, processor 210 may execute one or more programs located remotely from computing system 200. For example, financial service provider device 120, biometric database 130, or user device 110, may, via computing system 200 (or variants thereof), access one or more remote programs that, when executed, perform functions related to certain disclosed embodiments. Processor 210 may further execute one or more programs located in database 240. In some embodiments, programs 236 may be stored in an external storage device, such as a cloud server located outside of computing system 200, and processor 210 may execute programs 236 remotely.

Programs executed by processor 210 may cause processor 210 to execute one or more processes related to financial services provided to users including, but not limited to, processing credit and debit card transactions, checking transactions, fund deposits and withdrawals, transferring money between financial accounts, lending loans, processing payments for credit card and loan accounts, and processing ATM cash withdrawals.

Memory 230 may also store data that may reflect any type of information in any format that the system may use to perform operations consistent with the disclosed embodiments. Memory 230 may store instructions to enable processor 210 to execute one or more applications, such as server applications, an authentication application, network communication processes, and any other type of application or software. Alternatively, the instructions, application programs, etc., may be stored in an external storage (not shown) in communication with computing system 200 via network 140 or any other suitable network. Memory 230 may be a volatile or non-volatile, magnetic, semiconductor, tape, optical, removable, non-removable, or other type of storage device or tangible (i.e., non-transitory) computer-readable medium.

Memory 230 may include transaction data 232. Transaction data 232 may include information related to electronic transactions initiated by a user. For example, transaction data may include a user identifier and a transaction type. The user identifier may be a credit or debit card number, and account number, or another means for identifying the user initiating the financial transaction. The transaction type may include an indicator of the type of transaction the user is initiating, such as, ATM cash withdrawal, debit PIN reset, money wire or transfer, call to the customer service center, or other transactions requiring user authentication. Transaction data 232 may also include biometric data obtained from the user for the purposes of authorizing the transaction by verifying the authenticity of the provided biometric data as compared to stored biometric data. Additionally or alternatively, transaction data 232 may be stored in database 240 or in an external storage (not shown) in communication with computing system 200 via network 140 or any other suitable network.

Memory 230 may further include customer data 234. Customer data 234 may include information about particular customers of the financial service provider. For example, customer data 234 may include customers' account information, debit or credit card information, history of purchase transactions, financial statements, credit score, risk profile, username and password, debit card PIN, home and work locations, and/or biometric information. Additionally, customer data 234 may include biometric data about a particular customer, such as, for example, fingerprint information, facial recognition information, retinal or iris scan information, voice recognition information. In some embodiments, biometric database 130 may further provide biometric data to FSP device 120, or may permit FSP device 120 to access biometric data stored in biometric database 130 for purposes of confirming an authorization transaction. Biometric database 130 may provide this information to FSP device 120 via network 140. Alternatively, FSP device 120 may access the biometric data stored in biometric database 130 via network 140. Alternatively customer data 234 may be stored in database 240 or in an external storage (not shown) in communication with computing system 200 via network 140 or any other suitable network.

Processor 210 may analyze transaction data 232 in reference to customer data 234. For example, processor 210 may analyze transaction data to determine which customer with information stored in customer data 234 is initiating the financial transaction. Processor 210 may access the particular user's customer information 234 to determine their account information, debit or credit card information, history of purchase transactions, financial statements, credit score, risk profile, username and password, debit card PIN, home and work locations, and/or biometric data.

I/O devices 220 may be one or more device that is configured to allow data to be received and/or transmitted by computing system 200. I/O devices 220 may include one or more digital and/or analog communication devices that allow computing system 200 to communicate with other machines and devices, such as other components of system 100 shown in FIG. 1. For example, computing system 200 may include interface components, which may provide interfaces to one or more input devices, such as one or more keyboards, mouse devices, and the like, which may enable computing system 200 to receive input from an operator of FSP device 120 (not shown).

Computing system 200 may also contain one or more database(s) 240. Alternatively, computing system 200 may be communicatively connected to one or more database(s) 240. Computing system 200 may be communicatively connected to database(s) 240 through network 140. Database 240 may include one or more memory devices that store information and are accessed and/or managed through computing system 200. By way of example, database(s) 240 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. Database 240 may include computing components (e.g., database management system, database server, etc.) configured to receive and process requests for data stored in memory devices of database(s) 240 and to provide data from database 240.

As discussed above, FSP device 120 may include at least one computing system 200. Further, although sometimes discussed here in relation to FSP 200, it should be understood that variations of computing system 200 may be used by other components of system 100, including FSP device 120 and user device 110. Computing system 200 may be a single server or may be configured as a distributed computer system including multiple servers or computers that interoperate to perform one or more of the processes and functionalities associated with the disclosed embodiments.

In some aspects, biometric database 130 and/or user device 110 may include the same or similar configuration and/or components of computing system 200. For example, computing system 200 when implemented in biometric database 130 may include hardware and/or software installed therein for performing one or more processes disclosed herein.

Figure 3:
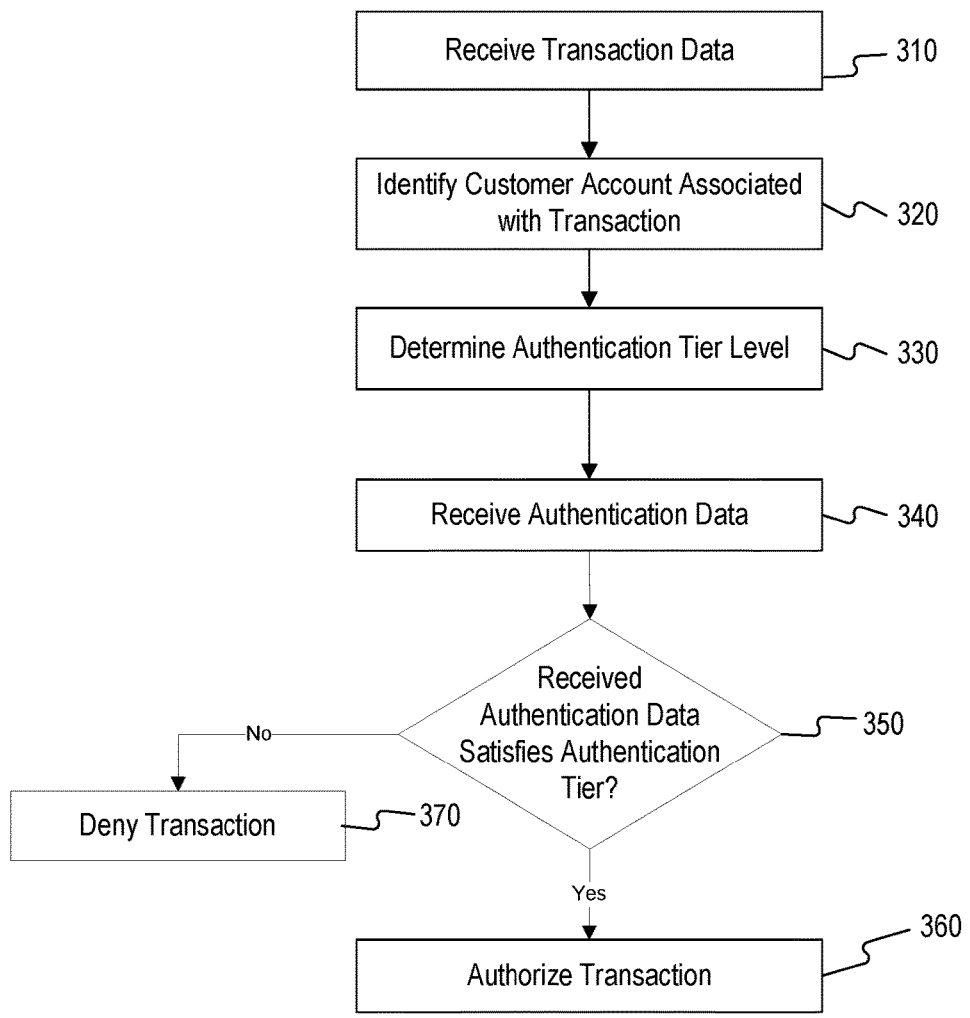
FIG. 3 is a flowchart of an exemplary process for authenticating an electronic transaction, consistent with disclosed embodiments.

FIG. 3 shows an exemplary financial authorization process, consistent with disclosed embodiments. Process 300 may be performed by processor 210 of, for example, FSP device 120 executing instructions encoded on a computer-readable medium storage device. It is to be understood, however, that one or more steps of process 300 may be implemented by other components of system 100 (shown or not shown), including biometric database 130 and/or user device 110. At step 310, FSP device 120 may receive transaction data. In one aspect, FSP device 120 may receive transaction data from user device 110. As an example, user device 110 execute a mobile application associated with the financial service provider associated with FSP device 120 that transmits transaction data via network 140 to FSP device 120. Transaction data may be entered and transmitted manually per transaction by a user into user device 110, for example by typing it on a keyboard or other input device (not shown). Transaction data may also be entered and transmitted automatically, for example, by a mobile application on user device 110.

Transaction data may include a type of transaction and a customer identifier. A type of transaction may include, for example, an ATM withdrawal, a money transfer or wire, a debit card PIN reset, or a call center transaction. If the type of transaction is, for example, an ATM withdrawal or a money transfer or wire, transaction data may further include an amount. In certain embodiments, transaction data may be include other data relating to transactions that is known to those skilled in the art, such as transaction amount, timestamp information, entity identifier, account identifier(s), etc.

At step 320, FSP device 120 may identify a customer account associated with the transaction data. FSP device 120 may identify the customer account, for example, based upon the customer identifier that may be included in the received transaction data. The associated customer account may be any type of financial account, such as, for example, a debit account, checking account, savings account, or credit card account.

At step 330, FSP device 120 may determine an identification tier level associated with the transaction. Each transaction may be associated with a tier level. Additionally, each user may have a different tier level associated with each transaction. The tier level may indicate how many data security points must be verified before FSP device 120 may authorize the requested transaction. Security data points may include, for example, a username and password, a GPS location, and a phone number or device identifier. Security data points may additionally include biometric data, such as, for example, fingerprint, retina or iris scan, facial recognition, voice recognition, palm vein scan, or heartbeat or pulse pattern. Each data security point may correspond to a different tier. For example, biometric data may relate to a higher tier (more secure) than a username and password (less secure).

At step 340, FSP device 120 may receive authentication data. In one embodiment, FSP device 120 may prompt the user to enter authorization data through user device 110. The authentication data requested by FSP device 120 may correspond to the authorization tier level. For example, if the requested transaction required an authentication tier level two, the user may be prompted first to enter, for example, a user name and password to satisfy tier one. Then, the user may be prompted to enter, for example, biometric data such as a finger print scan, vocal recording, retina or iris scan, facial scan or palm scan.

The user may provide authentication data via user device 110, and FSP device 120 may receive the authentication data (step 340). The form of authentication data provided by the user may be dependent on the type of user device 110 the user is using. For example, certain user devices may have a fingerprint scanner, but not a retina scanner. FSP device 120 may detect the capabilities of user device 110 when prompting the user to enter authentication data. Alternatively, FSP device 120 may prompt the user with a plurality of choices of authentication data the user may choose to enter, and the user may then select the option that corresponds with the capabilities of his or her particular user device 110.

At step 350, FSP device 120 may determine if the received authentication data satisfies the determined authentication tier. For example, if the authentication tier level for a particular transaction is 2, a user may first be prompted for a username and password; however, this data will not satisfy the required authentication tier. FSP device 120 may be configured to execute software that generates a prompt to (or causes a prompt to be generated to) the user for additional authentication data. In certain aspects, the disclosed embodiments may iteratively, prompt the user for additional authentication data until the required authentication tier is satisfied or a threshold is met to deny the transaction. For example, once the received authentication data is satisfied (step 350—yes), FSP device 120 may authorize the requested transaction (step 360). If however, the received transaction does not satisfy the required authentication tier, for example, because the biometric data does not match, the username and password are incorrect, the user is attempting to access his account through an unknown mobile device, etc. (step 350—no), FSP device 120 may deny the transaction (step 370). In certain aspects, FSP device 120 may be configured to generate and provide a message to user device 110 (or some other device) reflecting the results of the authentication operation (e.g., authentication denied and/or transaction denied; authentication accepted and/or transaction authorized).

Figure 4:
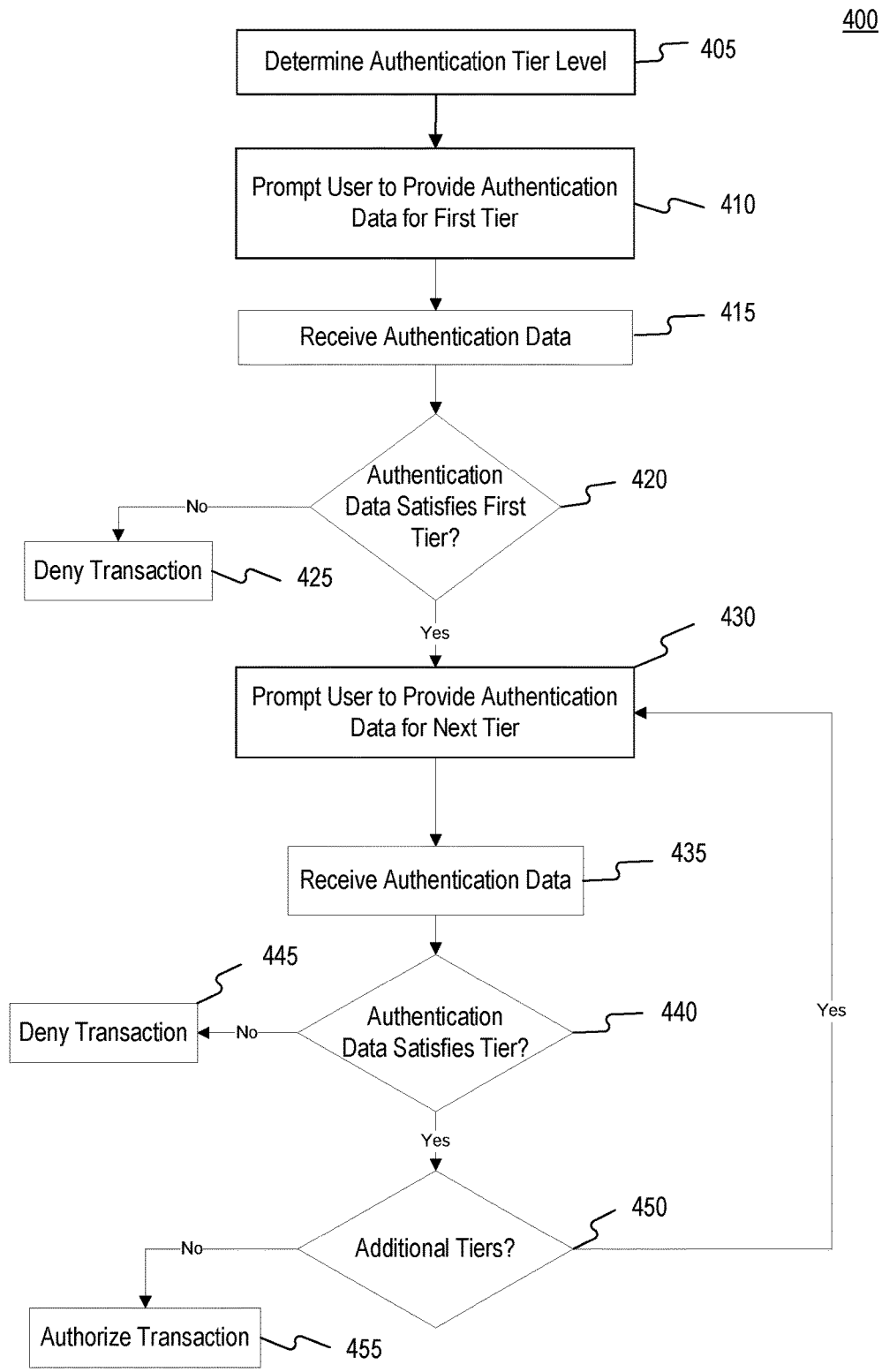
FIG. 4 is a flowchart of an exemplary process for authenticating an electronic transaction in a multi-tiered authentication system, consistent with disclosed embodiments.

FIG. 4 shows an exemplary multi-tiered authentication process 400, consistent with disclosed embodiments. Process 400 may be performed by processor 210 of, for example, FSP device 120 executing instructions encoded on a computer-readable medium storage device. It is to be understood, however, that one or more steps of process 400 may be implemented by other components of system 100 (shown or now shown), including biometric database 130 and/or user device 110.

At step 405, as also discussed with reference to FIG. 3, FSP device 120 may determine an authentication tier level for a particular transaction. Each transaction may be associated with a tier level. Additionally, different users associated with different user device(s) 110 may have a different tier level associated with each transaction. In certain aspects, different users may be customer(s) or potential customers of the financial service provider associated with FSP device 120. The tier level may indicate how many data security points must be verified before FSP device 120 may authorize the requested transaction. Security data points may include, for example, a username and password, a GPS location, and a phone number or device identifier. Security data points may additionally include biometric data, such as, for example, fingerprint, retina or iris scan, facial recognition, voice recognition, palm vein scan, or heartbeat or pulse pattern. Each data security point may correspond to a different tier. For example, biometric data may relate to a higher tier (more secure) than a username and password (less secure).

Assuming the authentication tier level determined in step 405 is greater than one, FSP device 120 may prompt the user to provide authentication data sufficient to satisfy the first authentication tier (step 410). FSP device 120 may then receive authentication data (step 415). FSP device 120 may receive authentication data from, for example, user device 110. Authentication data may be entered manually by the user (e.g., username and password) or may be automatically transmitted to FSP device 120 by user device 110 (e.g., GPS data, phone or device identifier, etc.).

FSP device 120 may then determine if the authentication data received satisfies the first authentication tier (step 420). FSP device 120 may determine if the authentication data satisfies the first tier by comparing the received authentication data with the stored customer information 234. Customer information 234 may be stored, for example, in memory 230 or database 240. Customer information 234 may additionally or alternatively be stored in biometric database 130. Biometric database 130 may be operated by the financial service provider. Alternatively, biometric database 130 may be operated and maintained by an independent third party or government entity. If the authentication data does not satisfy tier one (step 420—no), for example because the incorrect information was entered and there is not a match between the authentication data and the stored customer data, FSP device 120 may deny the transaction (step 425). If the authentication data satisfies tier one (step 420—yes), FSP device 120 may indicate that the first tier of authentication has been satisfied and then move on to the next tier.

At step 430, FSP device 120 again may prompt the user to provide authentication data. This time, the prompted authentication data may respond to the second tier. For example, second tier authentication data may indicate a higher level of security. For example, second tier authentication data may include GPS location, phone or device identification information, or user biometric data. If the requested second tier authentication data is related to user device 110 (e.g., GPS location or device identification information), the request for authentication data, as well as the responsive transmission of the requested data, may occur automatically and transparent to the user.

Similar to that discussed above in connection with a tier one operation, at step 435, FSP device 120 may receive the authentication data, and then at step 440, FSP device 120 may determine if the received authentication data satisfies the second tier. If the authentication data does not satisfy the tier (step 440—no), for example because incorrect information was received, FSP device 120 may deny the transaction (step 445). Alternatively, if the received authentication data satisfies the tier (step 440—yes), FSP device 120 may then determine if there are additional authentication tiers that need to be satisfied before the particular transaction can be authorized (step 450). If there are no additional tiers (step 450—no), then FSP device may authorize the transaction. If, however, there are additional authentication tiers for the particular transaction (step 450—yes), FSP device repeats the process beginning with step 430 again, and continues to do so until all authorization tiers are satisfied. In certain aspects, FSP device 120 may be configured to generate and provide a message to user device 110 (or some other device) reflecting the results of the authentication operation(s) (e.g., authentication denied and/or transaction denied; authentication accepted and/or transaction authorized).

Figure 5:
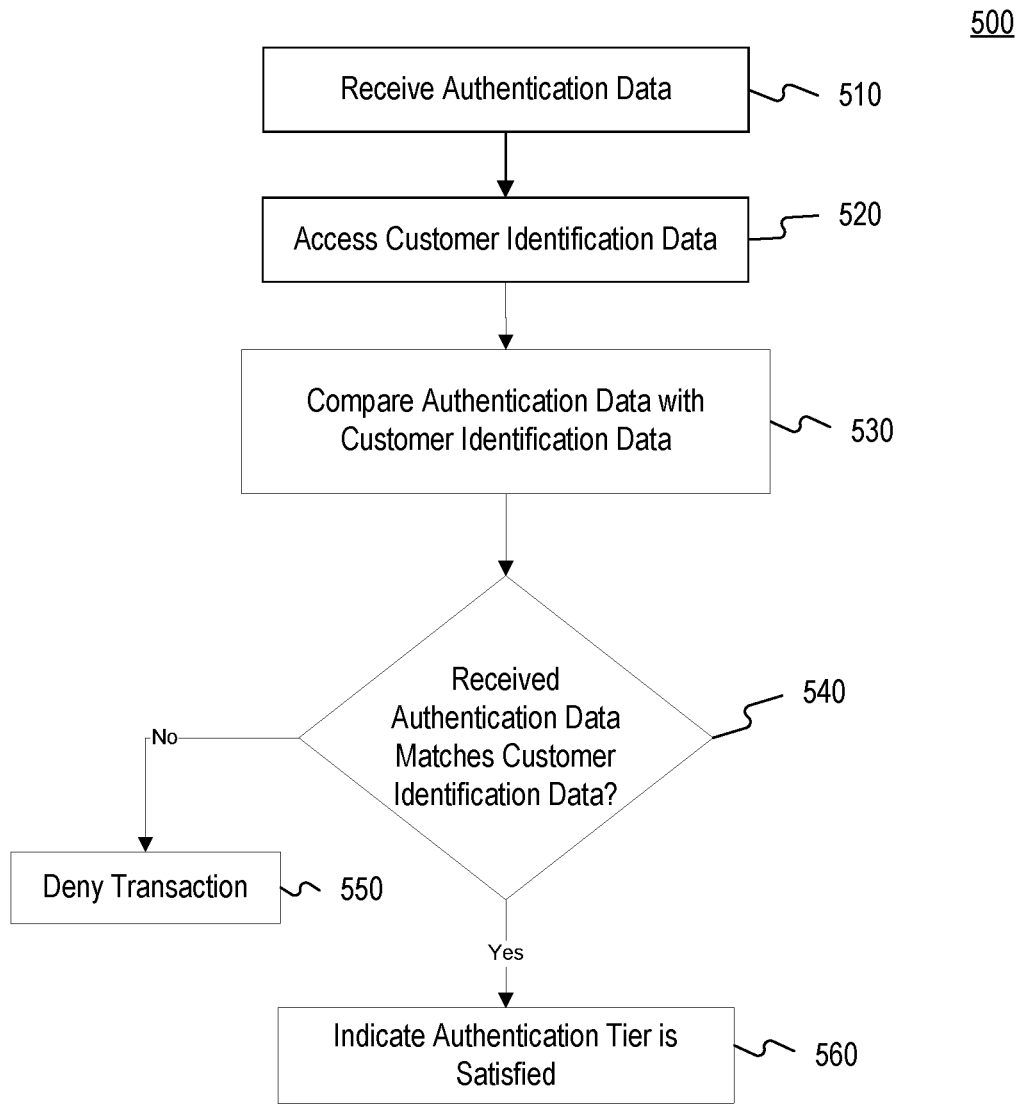
FIG. 5 is a flowchart of an exemplary process for authenticating a particular tier in a multi-tiered authentication system, consistent with disclosed embodiments.

FIG. 5 shows an exemplary authentication process 500, consistent with disclosed embodiments. Process 500 may be performed by processor 210 of, for example, FSP device 120 executing instructions encoded on a computer-readable medium storage device. It is to be understood, however, that one or more steps of process 500 may be implemented by other components of system 100 (shown or not shown), including biometric database 130 and/or user device 110.

At step 510, FSP device 120 may receive authentication data, as discussed previously with respect to FIGS. 3 and 4. At step 520, FSP device 120 may access customer identification data. Customer identification data may be stored, for example, in memory 230 or database 240 of FSP device 120. Additionally or alternatively, customer identification data may be stored in biometric database 130. Customer identification data may include any stored data related to a customer that may correspond to the authentication data requested of a customer in order to validate the customer's identity for authentication purposes. For example, customer data may include a username and password, a known GPS location (e.g., the customer's home or work location), a device identifier (e.g., phone number, device serial number, IP address, etc.). Customer data may further include biometric data, such as, for example, fingerprints, retina and/or iris scans, palm vein scan, facial image, heartbeat or pulse pattern, or voice recording.

At step 530, FSP device 120 may compare the received authentication data to determine if it matches the stored customer identification data. If the received authentication data does not match the customer identification data (step 540—no), FSP device 120 may deny the transaction (step 550). In certain aspects, FSP device 120 may be configured to generate and provide a message to user device 110 (or some other device) that the transaction was denied. If the received authentication data matches the corresponding customer data (step 540—yes), FSP device 120 may indicate that the authentication tier is satisfied (step 560). For example, FSP device 120 may be configured to execute software that generates information used to provide an indication reflecting the status of the authentication analysis, whether a transaction is authorized, etc. For example, in one embodiment, FSP device 120 may be configured to provide information to user device 110 that device 110 may use to generate and provide a message in an interface presented in a display device of user device 110. For instance, user device 110 may be configured, based on information provided by FSP device 120 to display a message on a display device that the authentication tier is satisfied or that a transaction has been authorized. Additionally or alternatively, FSP device 120 may internally indicate that the tier is satisfied, transparent to the user, by either prompting the user for authentication data relating to the next authentication tier, or if the final tier is satisfied, by authorizing the transaction. If the satisfied authentication tier corresponds to the determined authentication tier level required for the transaction, FSP device may authorize the transaction.

Figure 6:
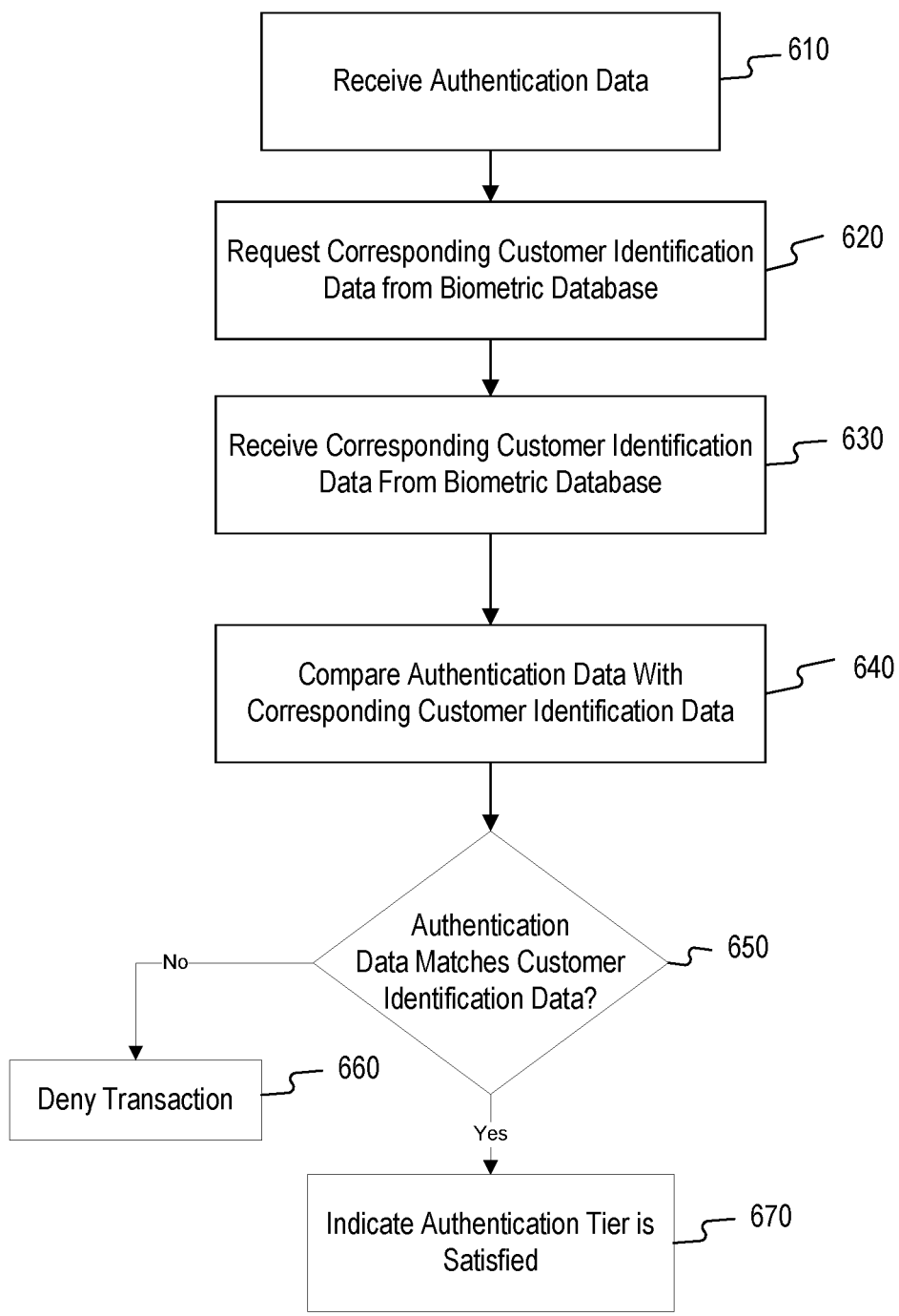
FIG. 6 is a flowchart of an exemplary process for authenticating an electronic transaction when customer data is held by a third party, consistent with disclosed embodiments.

FIG. 6 shows an exemplary authentication process implemented when, for example, the customer identification data is stored on a remote biometric database 130, consistent with disclosed embodiments. Process 600 may be performed by processor 210 of, for example, FSP device 120 executing instructions encoded on a computer-readable medium storage device. It is to be understood, however, that one or more steps of process 600 may be implemented by other components of system 100 (shown or not shown), including biometric database 130 and/or user device 110.

At step 610, FSP device 120 may receive authentication data, as discussed in detail with respect to FIGS. 3 and 4. At step 620, FSP device 120 may request corresponding customer identification data from biometric database 130. Requesting customer identification data may include, for example, requesting access to biometric database 130. Additionally or alternatively, requesting customer identification data may include, for example, requesting biometric database 130 transmit the necessary information to FSP device 120, for example, via network 140. Additionally or alternatively, requesting customer identification data may include FSP device 120 transmitting the received authentication data to biometric database 130, and allowing biometric database 130 to conduct the validation and authentication. At step 630, FSP device 120 may receive customer identification data from biometric database 130.

At step 640, FSP device 120 may compare the received authentication data with the corresponding customer identification data received or accessed in step 630. Additionally or alternatively, step 640 may be performed by biometric database 130. Based on the comparison, FSP device 120 (or alternatively biometric database 130) may determine if the received authentication data matches the customer identification data (step 650). If the received authentication data does not match the stored customer identification data (step 650—no), FSP device 120 may deny the transaction (step 660). In certain aspects, FSP device 120 may be configured to generate and provide a message to user device 110 (or some other device) that the transaction was denied. If the received authentication data matches the customer identification data (step 650—yes), FSP device 120 may then indicate that the authentication tier is satisfied (step 670). For example, FSP device 120 may be configured to execute software that generates information used to provide an indication reflecting the status of the authentication analysis, whether a transaction is authorized, etc. For example, in one embodiment, FSP device 120 may be configured to provide information to user device 110 that device 110 may use to generate and provide a message in an interface presented in a display device of user device 110. For instance, user device 110 may be configured, based on information provided by FSP device to display a message to the user that the authentication tier is satisfied or notifying the user that the transaction has been authorized. Additionally or alternatively, FSP device 120 may internally indicate that the tier is satisfied, transparent to the user, by either prompting the user for authentication data relating to the next authentication tier, or if the final tier is satisfied, by authorizing the transaction. If the satisfied authentication tier corresponds to the determined authentication tier level required for the transaction, FSP device may authorize the transaction.

Figure 7:
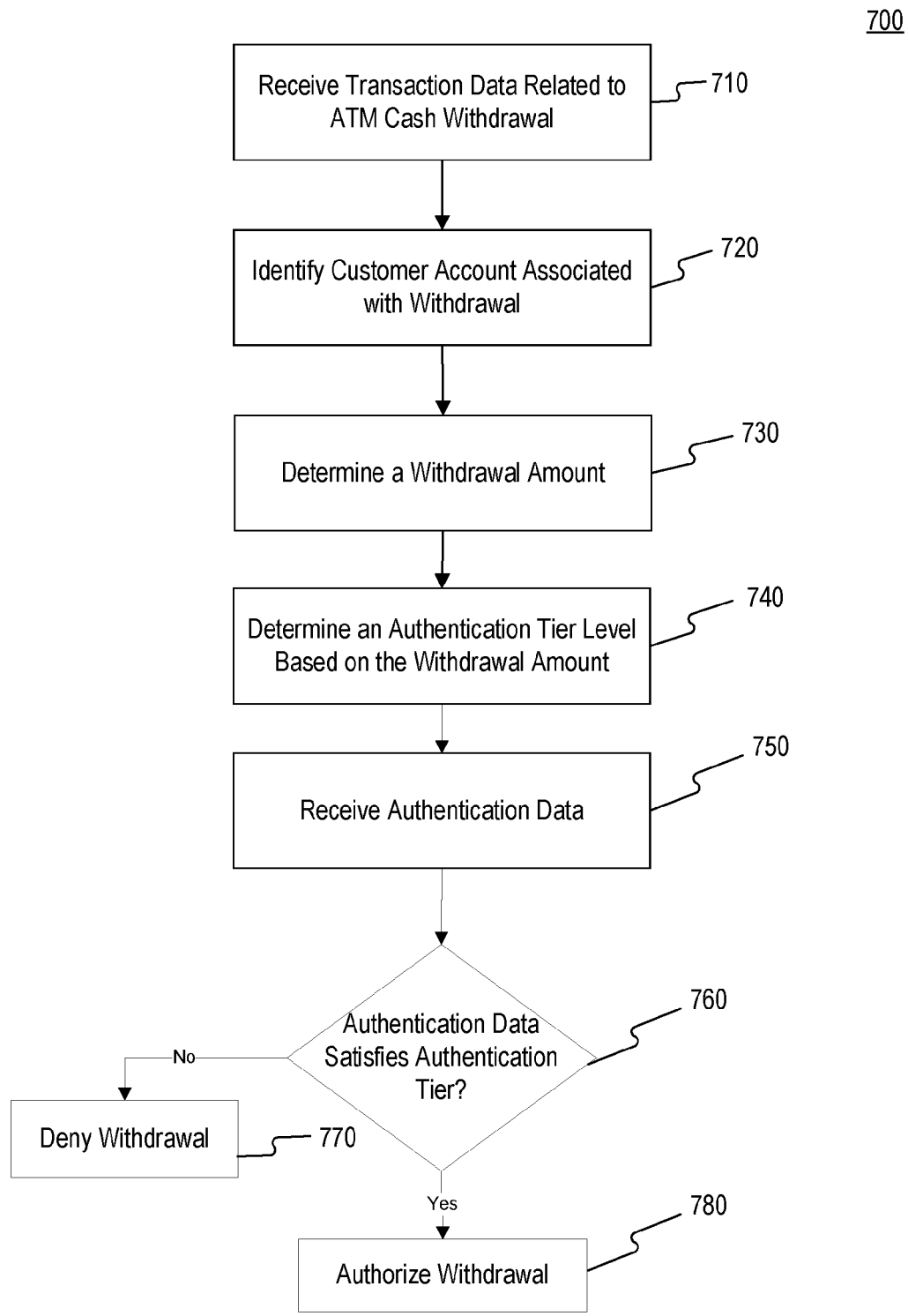
FIG. 7 is a flowchart of an exemplary multi-tiered authentication process relating to an ATM withdrawal transaction, consistent with disclosed embodiments.

FIG. 7 shows an exemplary authentication process 700, consistent with disclosed embodiments, relating to an ATM withdrawal transaction. Process 700 may be performed by processor 210 of, for example, FSP device 120 executing instructions encoded on a computer-readable medium storage device. It is to be understood, however, that one or more steps of process 700 may be implemented by other components of system 100 (shown or not shown), including biometric database 130 and/or user device 110.

At step 710, FSP device 120 may receive transaction data related to an ATM cash withdrawal. For example, a user may indicate through a mobile application installed on user device 110 that he or she wishes to make an ATM withdrawal. At step 720, FSP device 120 may then identify a customer account associated with the transaction. FSP device 120 may identify the customer account by locating the matching customer account based on the transaction data. Additionally or alternatively, the mobile application on user device 110 the customer may be using to initiate the transaction may require the user to log into a user account. If the user is logged into a user account on the mobile application, user device 110 may then automatically transmit the necessary information to FSP device 120 in order for FSP device to identify the corresponding customer account.

FSP device may then determine the withdrawal amount (step 730). The withdrawal amount may be automatically transmitted to FSP device 120 by user device 110 when the user initiates the ATM withdrawal transaction. Additionally or alternatively, the withdrawal amount may be included in the transaction data received by FSP device at step 710. Based on the customer account and the withdrawal amount, FSP device 120 may then determine an authentication tier level for the transaction (step 740). For example, the higher the withdrawal amount, the higher the authentication tier level may be in order to have the withdrawal transaction authorized. Additionally or alternatively, the authentication tier may be determined by a rules engine that may be a part of the FSP device 120 or may be a stand-alone server or computer, such as that described with respect to FIG. 2, that is communicatively connected with FSP device 120 and/or user device 110. In certain embodiments, the authentication tier may be determined by user device 110. For example, user device 110 may be running an application that may determine the authentication tier related to different transactions based on, for example, preprogrammed algorithms or instructions received from FSP device 120.

At step 750, FSP device 120 may receive authentication data, as discussed in detail with respect FIGS. 3 and 4. FSP device 120 (or alternatively biometric database 130) may then determine if the received authentication data matches the customer identification data, and therefore satisfies the authentication tier (step 760). FSP device 120 (or biometric database 130) may determine if the received authentication data matches the customer identification data by conducting a comparison as discussed in detail with respect to FIG. 6. If the received authentication data does not match the stored customer identification data, and therefore does not satisfy the authentication tier, (step 760—no), FSP device 120 may deny the transaction (step 770). In certain aspects, FSP device 120 may be configured to generate and provide a message to user device 110 (or some other device) that the transaction was denied. If the received authentication data matches the customer identification data (step 760—yes), FSP device 120 may then indicate that the authentication tier is satisfied. For example, FSP device 120 may be configured to execute software that generates information used to provide an indication reflecting the status of the authentication analysis, whether a transaction is authorized, etc. For example, in one embodiment, FSP device 120 may be configured to provide information to user device 110 that device 110 may use to generate and provide a message in an interface presented in a display device of user device 110. For instance, user device 110 may be configured, based on information provided by FSP device to display a message to the user that the authentication tier is satisfied or notifying the user that the transaction has been authorized. Additionally or alternatively, FSP device 120 may internally indicate that the tier is satisfied, transparent to the user, by either prompting the user for authentication data relating to the next authentication tier, or if the final tier is satisfied, by authorizing the transaction. If the satisfied authentication tier corresponds to the determined authentication tier level required for the transaction, FSP device 120 may authorize the transaction and allow the withdrawal (step 780).

Figure 8:
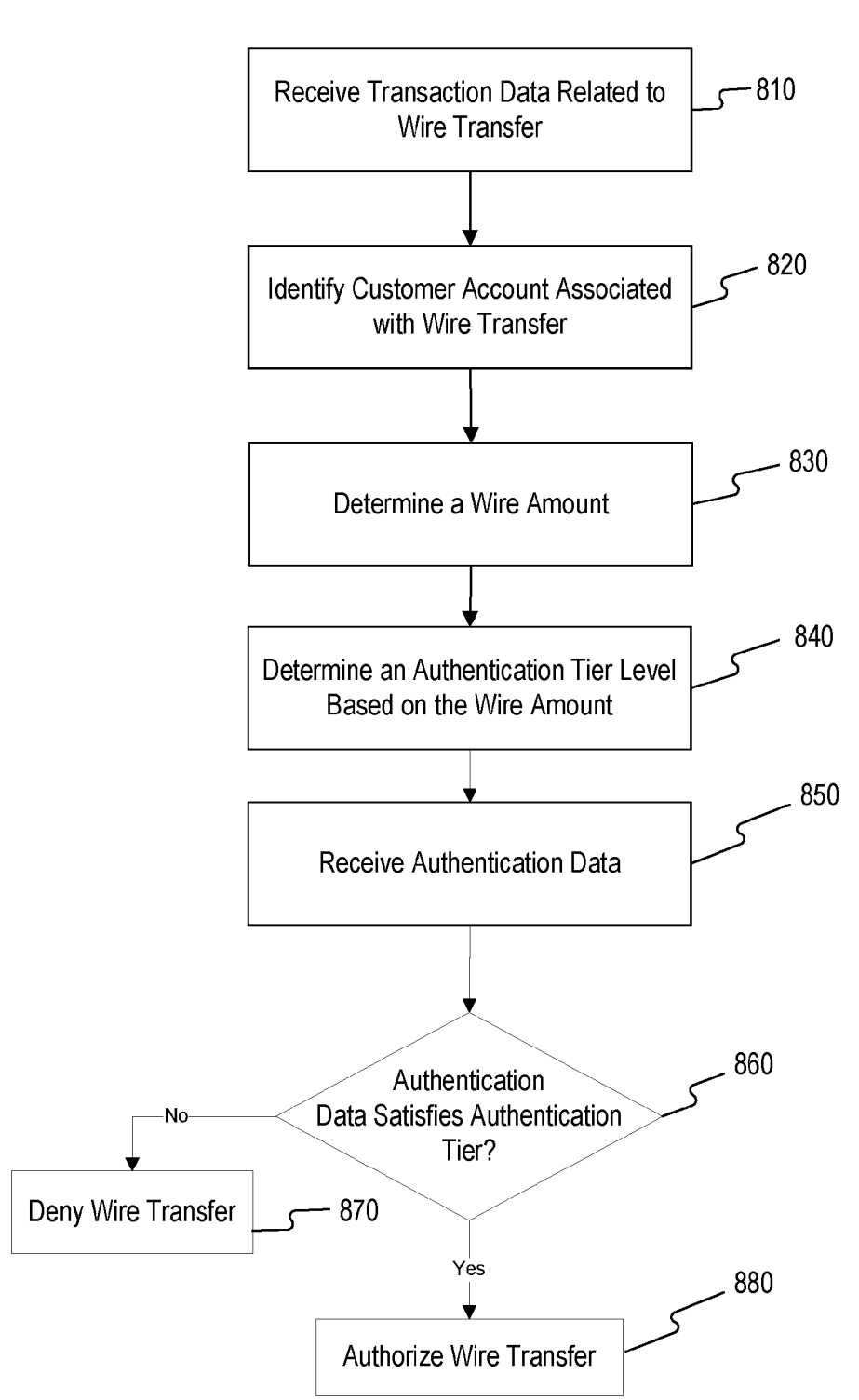
FIG. 8 is a flowchart of an exemplary multi-tiered authentication process relating to a wire transfer transaction, consistent with disclosed embodiments.

FIG. 8 shows an exemplary authentication process 800, consistent with disclosed embodiments, relating to a wire transfer transaction. Process 800 may be performed by processor 210 of, for example, FSP device 120 executing instructions encoded on a computer-readable medium storage device. It is to be understood, however, that one or more steps of process 800 may be implemented by other components of system 100 (shown or not shown), including biometric database 130 and/or user device 110.

At step 810, FSP device 120 may receive transaction data related to wire transfer. For example, a user may indicate through a mobile application installed on user device 110 that he or she wishes to make a wire transfer. At step 820, FSP device 120 may then identify a customer account associated with the transaction. FSP device 120 may identify the customer account by locating the matching customer account based on the transaction data. Additionally or alternatively, the mobile application on user device 110 the customer may be using to initiate the transaction may require the user to log into a user account. If the user is logged into a user account on the mobile application, user device 110 may then automatically transmit the necessary information to FSP device 120 in order for FSP device 120 to identify the corresponding customer account.

FSP device 120 may then determine the wire amount (step 830). The withdrawal amount may be automatically transmitted to FSP device by user device 110 when the user initiates the wire transfer transaction. Additionally or alternatively, the withdrawal amount may be included in the transaction data received by FSP device 120 at step 810. Based on the customer account and the wire amount, FSP device 120 may then determine an authentication tier level for the transaction (step 840). For example, the higher the withdrawal amount, the higher the authentication tier level may be in order to have the wire transaction authorized (step 880).

At step 850, FSP device 120 may receive authentication data, as discussed in detail with respect FIGS. 3 and 4. FSP device 120 (or alternatively biometric database 130) may then determine if the received authentication data matches the customer identification data, and therefore satisfies the authentication tier (step 860). FSP device 120 (or biometric database 130) may determine if the received authentication data matches the customer identification data by conducting a comparison as discussed in detail with respect to FIG. 6. If the received authentication data does not match the stored customer identification data, and therefore does not satisfy the authentication tier, (step 860—no), FSP device 120 may deny the wire transaction (step 870). In certain aspects, FSP device 120 may be configured to generate and provide a message to user device 110 (or some other device) that the transaction was denied. If the received authentication data matches the customer identification data (step 860—yes), FSP device 120 may then indicate that the authentication tier is satisfied. For example, FSP device 120 may be configured to execute software that generates information used to provide an indication reflecting the status of the authentication analysis, whether a transaction is authorized, etc. For example, in one embodiment, FSP device 120 may be configured to provide information to user device 110 that device 110 may use to generate and provide a message in an interface presented in a display device of user device 110. For instance, user device 110 may be configured, based on information provided by FSP device 120 to display a message to the user that the authentication tier is satisfied or notifying the user that the transaction has been authorized. Additionally or alternatively, FSP device 120 may internally indicate that the tier is satisfied, transparent to the user, by either prompting the user for authentication data relating to the next authentication tier, or if the final tier is satisfied, by authorizing the transaction. If the satisfied authentication tier corresponds to the determined authentication tier level required for the transaction, FSP device 120 may authorize the wire transaction and allow the withdrawal (step 880).

Figure 9:
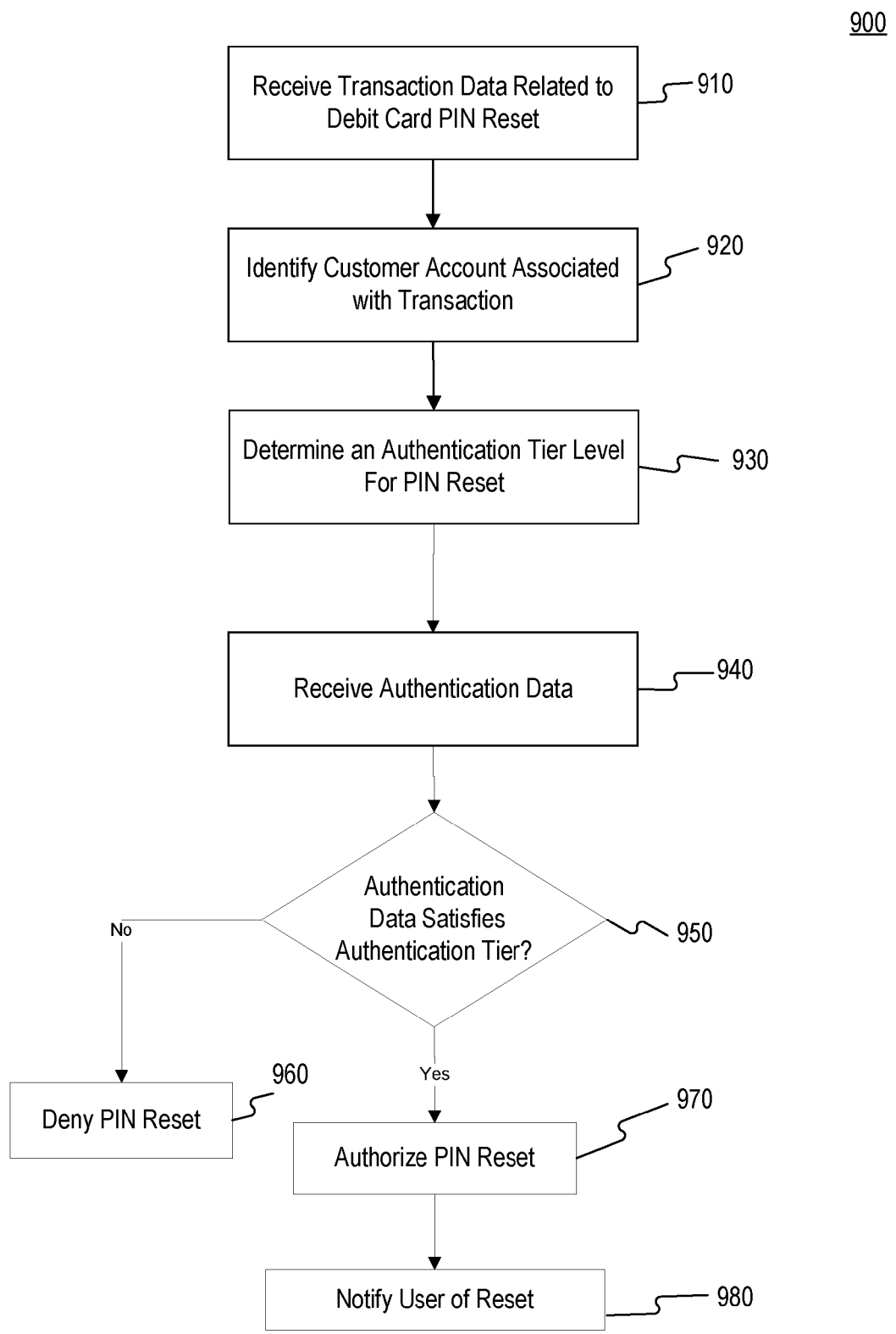
FIG. 9 is a flowchart of an exemplary multi-tiered authentication process relating to a debit card PIN reset transaction, consistent with disclosed embodiments.

FIG. 9 shows an exemplary authentication process 900, consistent with disclosed embodiments, relating to a debit card PIN reset transaction. Process 900 may be performed by processor 210 of, for example, FSP device 120 executing instructions encoded on a computer-readable medium storage device. It is to be understood, however, that one or more steps of process 900 may be implemented by other components of system 100 (shown or not shown), including biometric database 130 and/or user device 110.

At step 910, FSP device 120 may receive transaction data related to a debit card PIN (or other credential information) reset. For example, a user may indicate through a mobile application installed on user device 110 that he or she wishes to reset his or her debit card PIN number (or other credential information). At step 920, FSP device 120 may then identify a customer account associated with the transaction. FSP device 120 may identify the customer account by locating the matching customer account based on the transaction data. Additionally or alternatively, the mobile application on user device 110 that is used to initiate the transaction may require the user to log into a user account. If the user is logged into a user account on the mobile application, user device 110 may then automatically transmit the necessary information to FSP device 120 in order for FSP device 120 to identify the corresponding customer account.

FSP device 120 may then determine an authentication tier level for the debit card PIN reset (step 930). For example, if a user has reset his or her PIN multiple times in the recent past, for security purposes, a higher tier may be required to reset the PIN number an additional time.

At step 940, FSP device 120 may receive authentication data, as discussed in detail with respect FIGS. 3 and 4. FSP device 120 (or alternatively biometric database 130) may then determine if the received authentication data matches the customer identification data, and therefore satisfies the authentication tier (step 950). FSP device 120 (or biometric database 130) may determine if the received authentication data matches the customer identification data by conducting a comparison as discussed in detail with respect to FIG. 6. If the received authentication data does not match the stored customer identification data, and therefore does not satisfy the authentication tier, (step 950—no), FSP device 120 may deny the transaction (step 960). In certain aspects, FSP device 120 may be configured to generate and provide a message to user device 110 (or some other device) that the transaction was denied. If the received authentication data matches the customer identification data (step 950—yes), FSP device 120 may then indicate that the authentication tier is satisfied. For example, FSP device 120 may be configured to execute software that generates information used to provide an indication reflecting the status of the authentication analysis, whether a transaction is authorized, etc. For example, in one embodiment, FSP device 120 may be configured to provide information to user device 110 that user device 110 may use to generate and provide a message in an interface presented in a display device of user device 110. For instance, user device 110 may be configured, based on information provided by FSP device to display a message to the user that the authentication tier is satisfied or notifying the user that the transaction has been authorized. Additionally or alternatively, FSP device 120 may internally indicate that the tier is satisfied, transparent to the user, by either prompting the user for authentication data relating to the next authentication tier, or if the final tier is satisfied, by authorizing the transaction. If the satisfied authentication tier corresponds to the determined authentication tier level required for the transaction, FSP device 120 may authorize the PIN rest (step 970). One the PIN has been reset, FSP device 120 may then notify the user that that PIN has been reset (step 980). The user may be notified, for example, through a text message, email, or message within the mobile application used to reset the PIN.

Figure 10:
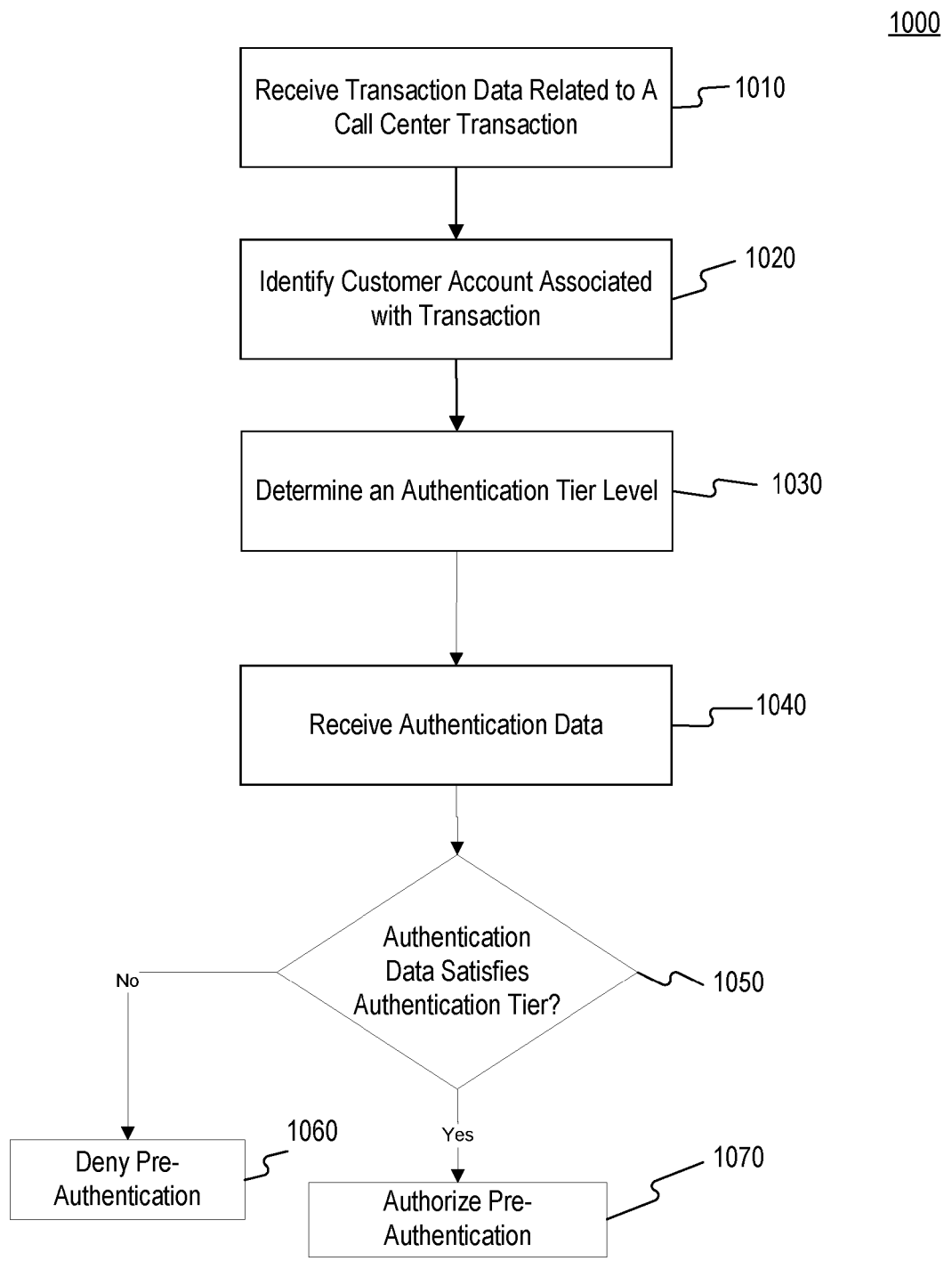
FIG. 10 is a flowchart of an exemplary authentication process relating to a call center transaction, consistent with disclosed embodiments.

FIG. 10 shows an exemplary authentication process 1000, consistent with disclosed embodiments, as implemented in a call center transaction. Process 1000 may be performed by processor 210 of, for example, FSP device 120 executing instructions encoded on a computer-readable medium storage device. It is to be understood, however, that one or more steps of process 1000 may be implemented by other components of system 100 (shown or not shown), including biometric database 130 and/or user device 110.

At step 1010, FSP device 120 may receive transaction data related to a call center transaction. For example, a user may indicate through a mobile application installed on user device 110 that he or she wishes to make call to the customer service department of the financial service provider. For example, the user may have questions about his or her account or may require assistance using the mobile application. User device 110 may be configured to execute software instructions that provide interface(s) that enable the user to inquire customer service of the financial service provider. Process 1000 allows for pre-authorization of a caller, enabling them to avoid time consuming and hassling questions once their call is connected to an agent.

At step 1020, FSP device 120 may then identify a customer account associated with the transaction. FSP device 120 may identify the customer account by locating the matching customer account based on the transaction data. Additionally or alternatively, the mobile application on user device 110 the customer may be using to initiate the transaction may require the user to log into a user account. If the user is logged into a user account on the mobile application, user device 110 may then automatically transmit the necessary information to FSP device 120 in order for FSP device 120 to identify the corresponding customer account.

In certain embodiments, FSP device 120 may also determine the reason the user is requesting the call center transaction. A user may indicate via user device 110 the reason for the call center request. For example, a mobile application running on user device 110 may present the user with a menu of options to select from. User device 110 may execute software that collects input through an input device of user device 110 and stores the input information (e.g., data reflecting the user's option selection, free-form text representations of a reason for the call center transaction request, etc.) in memory. User device 110 may transmit the data relating to the reason for the call to FSP device 120. FSP device 120 may be configured to receive, store, and/or process the reason data to determine one or more reasons the user is making a call center request. For example FSP device 120 may execute software that analyzes the data to determine the reason the user is calling. For example, a user may have a simple question about the mobile applications, or the user may wish to reset his or her debit card PIN number (or other credential data), authorize a withdrawal or transfer, etc. Based on the reason for the transaction, FSP device 120 may then determine an authentication tier level for the transaction (step 1030). For example, a call center request relating to a user's financial account may require a higher tier of authorization.

At step 1040, FSP device 120 may receive authentication data, as discussed in detail with respect FIGS. 3 and 4. FSP device 120 (or alternatively biometric database 130) may then determine if the received authentication data matches the customer identification data, and therefore satisfies the authentication tier (step 1050). FSP device 120 (or biometric database 130) may determine if the received authentication data matches the customer identification data by conducting a comparison as discussed in detail with respect to FIG. 6. If the received authentication data does not match the stored customer identification data, and therefore does not satisfy the authentication tier, (step 1050—no), FSP device 120 may deny pre-authorization (step 1060). In certain aspects, FSP device 120 may be configured to generate and provide a message to user device 110 (or some other device) that the pre-authorization was denied. If the received authentication data matches the customer identification data (step 1050—yes), FSP device 120 may then then indicate that the authentication tier is satisfied. If the satisfied authentication tier corresponds to the determined authentication tier level required for the transaction, FSP device 120 may then authorize the user's pre-authentication (step 1070).

Figure 11:
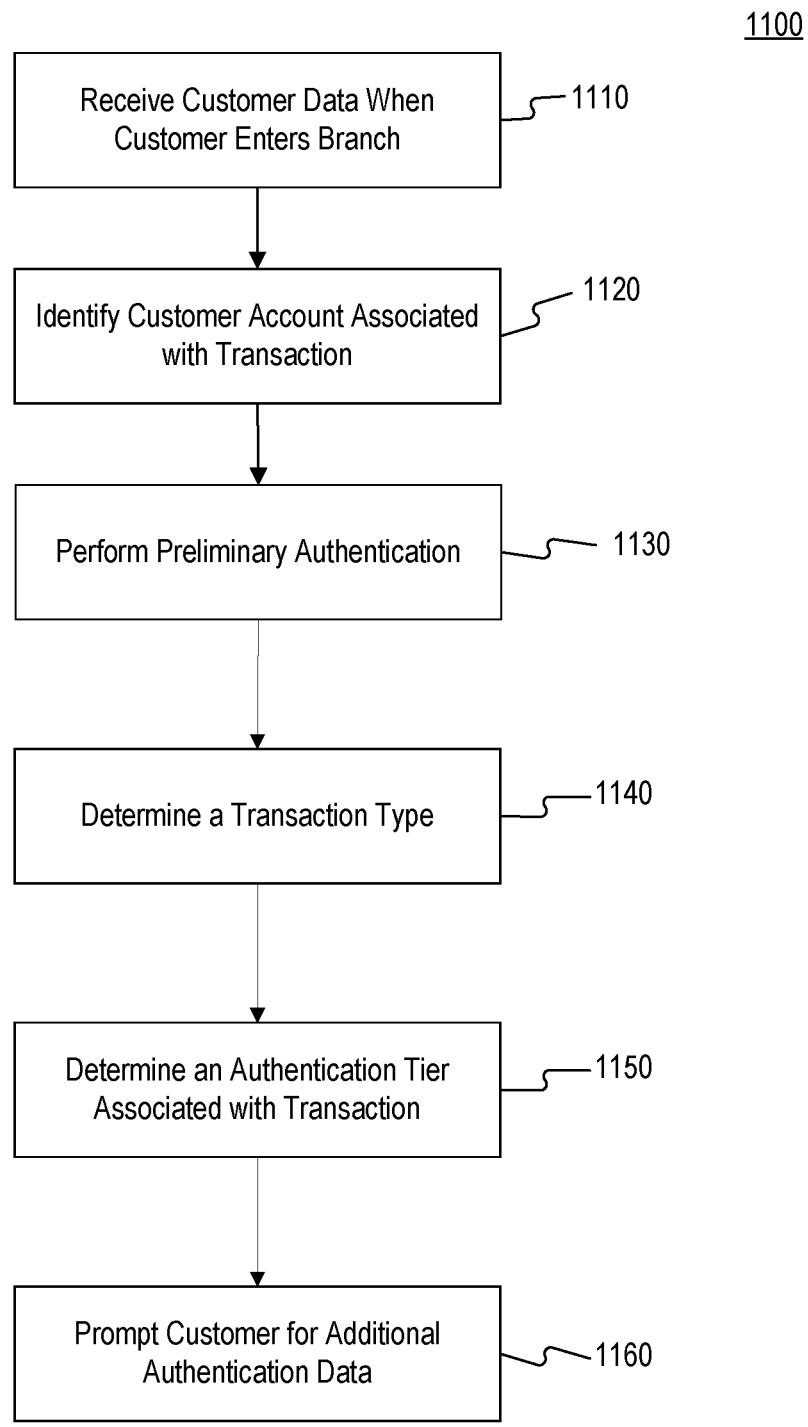
FIG. 11 is a flowchart of an exemplary authentication process relating to a branch entrance, consistent with disclosed embodiments.

FIG. 11 shows an exemplary authentication process 1100, consistent with disclosed embodiments, as implemented in a transaction initiated in person in a branch. Process 1100 may be performed by processor 210 of, for example, FSP device 120 executing instructions encoded on a computer-readable medium storage device. It is to be understood, however, that one or more steps of process 1100 may be implemented by other components of system 100 (shown or not shown), including biometric database 130 and/or user device 110.

At step 1110, FSP device 120 may receive customer data when a customer enters a branch. For example, an application running on user device 110 may allow FSP device 120 to detect user device 110 through, for example, Bluetooth™ low energy (LE), or other suitable detection means. A branch location may have a detection unit configured to detect the presence of user device 110 and transmit information relating to the particular user device 110 to FSP device 120.

At step 1120, FSP device 120 may identify a customer account associated with the transaction. FSP device 120 may identify the customer account by locating the matching customer account based on the detected user device 110. Additionally or alternatively, the mobile application on user device 110 may require the user to log into a user account. If the user is logged into a user account on the mobile application, user device 110 may automatically transmit the necessary information to FSP device 120 in order for FSP device to identify the corresponding customer account.

At step 1130, FSP device 120 may receive preliminary authentication data, as discussed in detail with respect FIGS. 3 and 4. FSP device 120 (or alternatively biometric database 130) may determine if the received authentication data matches the customer identification data, and therefore satisfies the authentication tier (step 1250). FSP device 120 (or biometric database 130) may determine if the received authentication data matches the customer identification data by conducting a comparison as discussed in detail with respect to FIG. 6. If the received authentication data matches the customer identification data, the user may be pre-authenticated. For example, once a user is pre-authenticated, the teller may be notified that the user has been pre-authenticated. This may prevent the user from having to present identification credentials to the teller. For example, if the user is waiting in a queue for a teller, he or she may be able to be pre-authenticated in order to save time when they reach the front of the queue.

Once a user reaches the front of the queue, FSP device 120 may determine a transaction type. (step 1140). For example, a user may indicate the type of transaction they wish to accomplish by informing the teller. The teller may then enter this information, for example, into FSP device 120, or into a device communicatively connected to FSP device 120, which may transmit the transaction data to FSP device 120.

FSP device 120 may determine an authentication tier level for the transaction (step 1150). For example, higher risk transactions such as cashing high value checks, making high value withdrawals, or changing PIN numbers may require a higher authentication tier. The teller may then prompt the user to provide additional authentication data (step 1160). For example, the user may provide authentication data directly to the teller. Additionally or alternatively, a user may enter additional authentication data through user device 110 as described in detail with respect to FIGS. 3 and 4. FSP device 120 may receive authentication data, as discussed in detail with respect FIGS. 3 and 4. FSP device 120 (or alternatively biometric database 130) may determine if the received authentication data matches the customer identification data, and therefore satisfies the authentication tier. FSP device 120 (or biometric database 130) may determine if the received authentication data matches the customer identification data by conducting a comparison as discussed in detail with respect to FIG. 6. If the customer identification data matches the authentication data, FSP device 120 may indicate to the teller that the transaction has been authenticated (steps not shown in figures).

Figure 12:
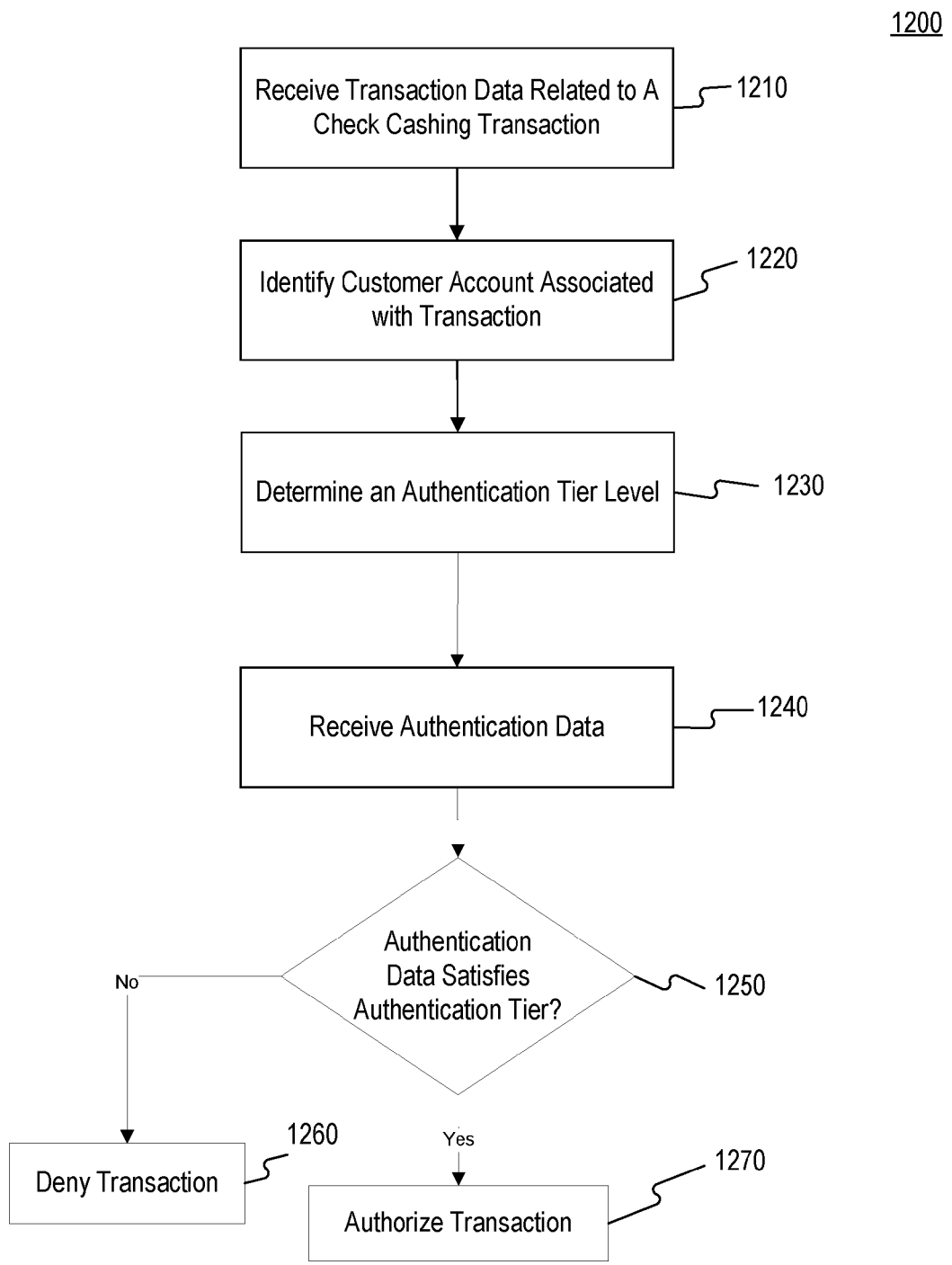
FIG. 12 is a flowchart of an exemplary authentication process relating to check cashing, consistent with disclosed embodiments.

FIG. 12 shows an exemplary authentication process 1200, consistent with disclosed embodiments, as implemented in a check cashing transaction. Process 1200 may be performed by processor 210 of, for example, FSP device 120 executing instructions encoded on a computer-readable medium storage device. It is to be understood, however, that one or more steps of process 1200 may be implemented by other components of system 100 (shown or not shown), including biometric database 130 and/or user device 110.

At step 1210, FSP device 120 may receive transaction data related to a check cashing transaction. For example, a user may indicate through a mobile application installed on user device 110 that he or she wishes to cash a check. Additionally or alternatively, a user may indicate using an ATM or on at a walk-up teller that he or she wishes to cash or deposit a check. User device 110 may be configured to execute software instructions that provide interface(s) that enable the user to initiate check cashing or depositing transactions. Received transaction data may include the check itself, a photograph of the check that may be taken, for example, through an application operating on user device 110, or other way of identifying the check being cashed or deposited.

At step 1220, FSP device 120 may identify a customer account associated with the transaction. FSP device 120 may identify the customer account by locating the matching customer account based on the transaction data. Additionally or alternatively, the mobile application on user device 110 the customer may be using to initiate the transaction may require the user to log into a user account. If the user is logged into a user account on the mobile application, user device 110 may then automatically transmit the necessary information to FSP device 120 in order for FSP device 120 to identify the corresponding customer account.

FSP device 120 may determine an authentication tier level for the transaction (step 1230). For example, cashing an on-us check may be considered a lower risk transaction and may therefore require a lower authentication tier. Cashing a check other than an on-us check may, for example, be considered a higher risk transaction and may require additional tiers of authentication. In certain embodiments, cashing a high dollar check may also require a higher authentication tier.

At step 1240, FSP device 120 may receive authentication data, as discussed in detail with respect FIGS. 3 and 4. FSP device 120 (or alternatively biometric database 130) may determine if the received authentication data matches the customer identification data, and therefore satisfies the authentication tier (step 1250). FSP device 120 (or biometric database 130) may determine if the received authentication data matches the customer identification data by conducting a comparison as discussed in detail with respect to FIG. 6. If the received authentication data does not match the stored customer identification data, and therefore does not satisfy the authentication tier, (step 1250—no), FSP device 120 may deny the transaction (step 1260). In certain aspects, FSP device 120 may be configured to generate and provide a message to user device 110 (or some other device) that the pre-authorization was denied. If the received authentication data matches the customer identification data (step 1250—yes), FSP device 120 may then then indicate that the authentication tier is satisfied. If the satisfied authentication tier corresponds to the determined authentication tier level required for the transaction, FSP device 120 may then authorize the transaction (step 1270). Authorizing the transaction may include, for example, depositing the check in the user's account and providing them with the requested cash back.

Figure 13:
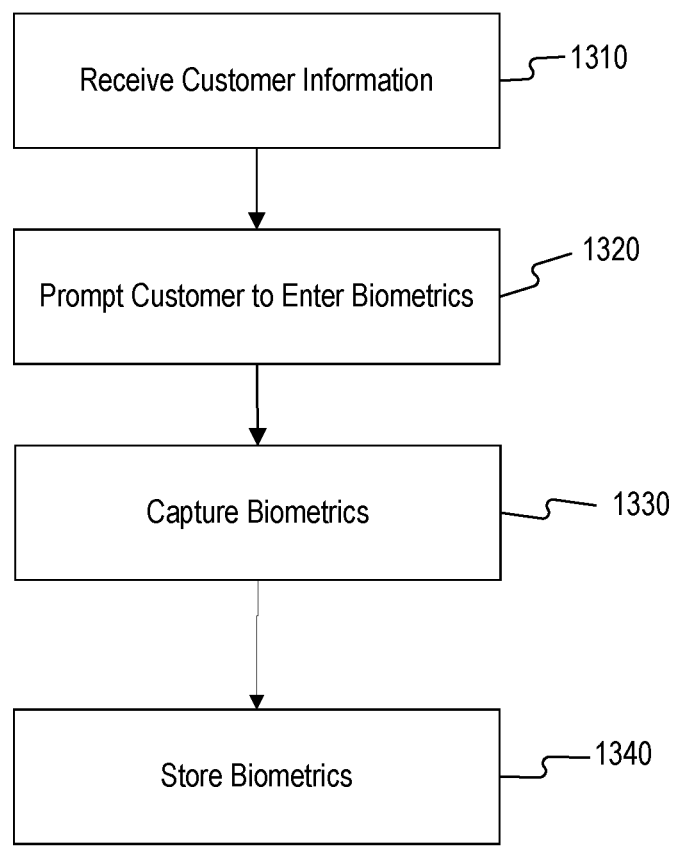
FIG. 13 is a flowchart of an exemplary customer enrollment process, consistent with disclosed embodiments.

FIG. 13 shows an exemplary customer enrollment process 1300, consistent with disclosed embodiments. Process 1300 may be performed by processor 210 of, for example, FSP device 120 executing instructions encoded on a computer-readable medium storage device. It is to be understood, however, that one or more steps of process 1300 may be implemented by other components of system 100 (shown or not shown), including biometric database 130 and/or user device 110.

At step 1310, FSP device 120 may receive customer information 234. For example, when a customer opens an account or enrolling in online or mobile banking functions, he or she may enter customer information 234 about themselves. For example, the customer may be prompted to enter standard questions about themselves (e.g. security questions) and provide personal information such as, for example, a social security number. FSP device 120 and/or user device 110 may be configured to display to the user a prompt to enter this information.

At step 1320, FSP device 120 may prompt a customer to enter biometric data such as, for example, a facial shot, a voice recording, a finger print, a retina or iris scan, and/or a palm vein scan. For example, FSP device 120 and/or user device 110 may be configured to display to the user a prompt to enter biometric data. FSP device 120 may then capture the biometric data (step 1330). For example, a user may enter this data, for example, through user device 110, or additionally or alternatively directly into FSP device 120 or a device communicatively connected to FSP device 120.

At step 1340, FSP device 120 may store the captured biometric data. For example, biometric data may be stored in memory 230. Alternatively, biometric database 130 may store the captured biometric data. For example, once stored, biometric data may be later accessed by FSP device 120 in order to authenticate electronic transactions, consistent with disclosed embodiments.

Additionally or alternatively, process 1300 may be performed immediately following a transaction by a user. For example, if a user makes an ATM withdrawal using an application on mobile device 110, following the transaction, the application may prompt the user to enroll in the biometric authentication system. The user may then have the option to perform process 1300 in order to complete enrollment.

The above disclosed embodiments may be implemented to provide processes for authenticating ATM withdrawals. For example, a user wishing to make a low-value withdrawal may only need to satisfy a first tier of authentication, whereas a user wishing to make a high-value withdrawal may need to satisfy two or more levels of authentication. The number of authentication levels required to be satisfied for a particular transaction may be directly proportional to the value of the withdrawal.

In some examples, some or all of the logic for the above-described techniques may be implemented as a computer program or application or as a plug in module or sub component of another application. The described techniques may be varied and are not limited to the examples or descriptions provided. In some examples applications may be developed for download to mobile communications and computing devices, e.g., laptops, mobile computers, tablet computers, smart phones, etc., being made available for download by the user either directly from the device or through a website.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, while a financial service provider has been described herein as the entity authenticating transactions, it is to be understood that consistent with disclosed embodiments another entity may provide such services in conjunction with or separate from a financial service provider.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. A financial service provider device for authenticating electronic transactions, comprising:
   one or more memory devices storing instructions; and
   one or more processors configured to execute the instructions to perform operations comprising:
      receiving transaction data associated with a transaction, from a mobile device associated with a customer, the transaction data comprising a customer identifier and a transaction type indicator;
      analyzing the transaction data with an authentication application, wherein the application:
         determines a transaction amount based on the received transaction data and transaction type indicator,
         determines a type of the transaction based on the received transaction data and transaction type indicator,
         determines a transaction channel based on the received transaction data and transaction type indicator, and
         identifies a customer account associated with the customer, based on the customer identifier;
      dynamically determining an authentication tier level associated with the transaction amount, type of transaction, transaction channel, and customer account, wherein the authentication tier level comprises a plurality of security points required to authorize the transaction;
      prompting the customer to submit security point data;
      receiving the security point data;
      determining whether the security point data satisfies the authentication tier level;
      authorizing the transaction when the security point data satisfies the authentication tier level; and
      notifying the customer of the authorized transaction.

2. The financial service provider of claim 1, wherein the authentication tier level is associated with a first authentication tier and a second authentication tier.

3. The financial service provider of claim 2, wherein the operations further comprise:

prompting the customer to provide first authentication tier data, a subset of the security point data, associated with the first authentication tier level;

receiving the first authentication tier data;

determining whether the first authentication tier data satisfies the first authentication tier level;

prompting the customer to provide second authentication tier data, a subset of the security point data, associated with the second authentication tier level;

receiving the second authentication tier data;

determining whether the second authentication data satisfies the second authentication tier level; and authorizing the transaction based on whether the first authentication tier data satisfies the first authentication tier level and whether the second authentication tier data satisfies the second authentication tier level.

4. The financial service provider device of claim 1, wherein the security point data comprises biometric data.

5. The financial service provider device of claim 4, wherein biometric data comprises at least one of a finger print, voice characteristics, facial characteristics, retinal scan characteristics, iris characteristics, heartbeat characteristics, or pulse characteristics.

6. The financial service provider device of claim 1, wherein the customer account is associated with corresponding customer identification data.

7. The financial service provider device of claim 6, wherein the operations further comprise:

comparing the received security point data with the customer identification data;

determining whether the received security point data matches the customer identification data; and when the received security point data matches the customer identification data, determining that the authentication tier level is satisfied.

8. A nontransitory computer-readable medium for storing instructions that, when executed by one or more processors, perform a set of operations for authenticating electronic transactions, the operations comprising:

receiving transaction data associated with a transaction, from a mobile device associated with a customer, the transaction data comprising a customer identifier and a transaction type indicator;

analyzing the transaction data with an authentication application, wherein the application:

determines a transaction amount based on the received transaction data and transaction type indicator, determines a type of the transaction based on the received transaction data and transaction type indicator, determines a transaction channel based on the received transaction data and transaction type indicator, and identifies a customer account associated with the customer, based on the customer identifier;

dynamically determining an authentication tier level associated with the transaction amount, type of transaction, transaction channel, and customer account, wherein the authentication tier level comprises a plurality of security points required to authorize the transaction;

prompting the customer to submit security point data;

receiving the security point data;

determining whether the security point data satisfies the authentication tier level;

authorizing the transaction when the security point data satisfies the authentication tier level; and notifying the customer of the authorized transaction.

9. The nontransitory computer-readable medium of claim 8, wherein the authentication tier level is associated with a first authentication tier and a second authentication tier.

10. The nontransitory computer-readable medium of claim 9, wherein the operations further comprise:

prompting the customer to provide first authentication tier data, a subset of the security point data, associated with the first authentication tier level;

receiving the first authentication tier data;

determining whether the first authentication tier data satisfies the first authentication tier level;

prompting the customer to provide second authentication tier data, a subset of the security point data, associated with the second authentication tier level;

receiving the second authentication tier data;

determining whether the second authentication data satisfies the second authentication tier level; and authorizing the transaction based on whether the first authentication tier data satisfies the first authentication tier level and whether the second authentication tier data satisfies the second authentication tier level.

11. The nontransitory computer-readable medium of claim 8, wherein the security point data comprises biometric data.

12. The nontransitory computer-readable medium of claim 11, wherein biometric data comprises at least one of a finger print, voice characteristics, facial characteristics, retinal scan characteristics, iris characteristics, heartbeat characteristics, or pulse characteristics.

13. The nontransitory computer-readable medium of claim 8, wherein the customer account is associated with corresponding customer identification data.

14. The nontransitory computer-readable medium of claim 13, wherein the operations further comprise:

comparing the received security point data with the customer identification data;

determining whether the received security point data matches the customer identification data; and when the received security point data matches the customer identification data, determining that the authentication tier level is satisfied.

15. A computer-implemented method for authenticating electronic transactions, comprising:

receiving transaction data associated with a transaction, from a mobile device associated with a customer, the transaction data comprising a customer identifier and a transaction type indicator;

analyzing the transaction data with an authentication application, wherein the application:

determines a transaction amount based on the received transaction data and transaction type indicator, determines a type of the transaction based on the received transaction data and transaction type indicator, determines a transaction channel based on the received transaction data and transaction type indicator, and identifies a customer account associated with the customer, based on the customer identifier;

dynamically determining an authentication tier level associated with the transaction amount, type of transaction, transaction channel, and customer account, wherein the authentication tier level comprises a plurality of security points required to authorize the transaction;

prompting the customer to submit security point data;

receiving the security point data;

determining whether the security point data satisfies the authentication tier level;

authorizing the transaction when the security point data satisfies the authentication tier level; and notifying the customer of the authorized transaction.

16. The method of claim 15, wherein the authentication tier level is associated with a first authentication tier and a second authentication tier.

17. The method of claim 16, further comprising:
prompting the customer to provide first authentication tier data, a subset of the security point data, associated with the first authentication tier level;
receiving the first authentication tier data;
determining whether the first authentication tier data satisfies the first authentication tier level;
prompting the customer to provide second authentication tier data, a subset of the security point data, associated with the second authentication tier level;
receiving the second authentication tier data;
determining whether the second authentication data satisfies the second authentication tier level; and
authorizing the transaction based on whether the first authentication tier data satisfies the first authentication tier level and whether the second authentication tier data satisfies the second authentication tier level.

18. The method of claim 15, wherein the security point data comprises biometric data.

19. The method of claim 18, wherein biometric data comprises at least one of a finger print, voice characteristics, facial characteristics, retinal scan characteristics, iris characteristics, heartbeat characteristics, or pulse characteristics.

20. The method of claim 15, wherein the customer account is associated with corresponding customer identification data.

* * * * *